3,329,050
CONTROL FOR DIE-CUTTING MACHINE
Victor C. Bianchi, 6 Rue Felicien David,
Paris, France
Filed Jan. 28, 1965, Ser. No. 428,623
1 Claim. (Cl. 83—58)

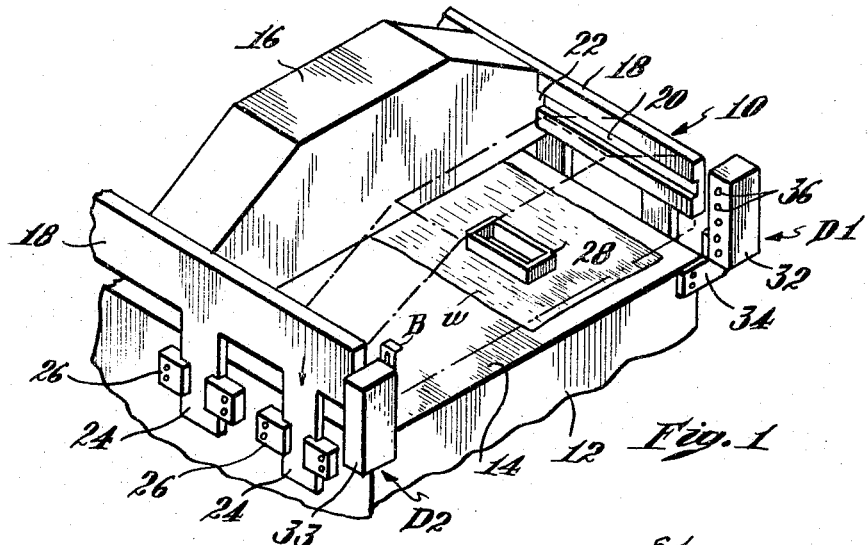
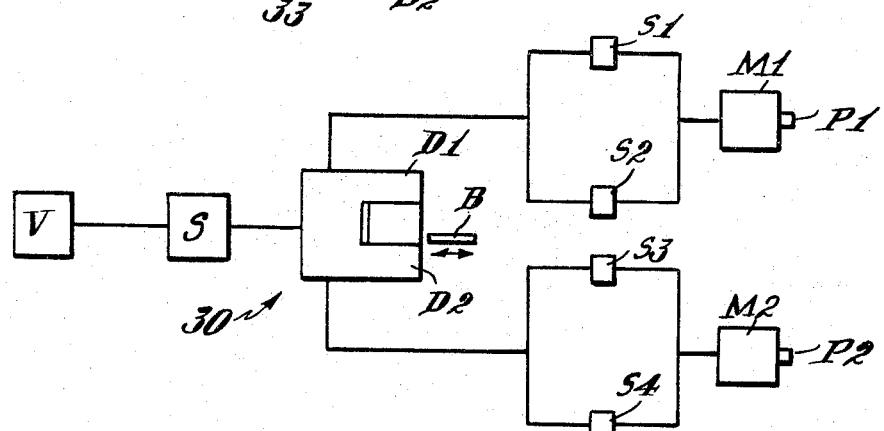
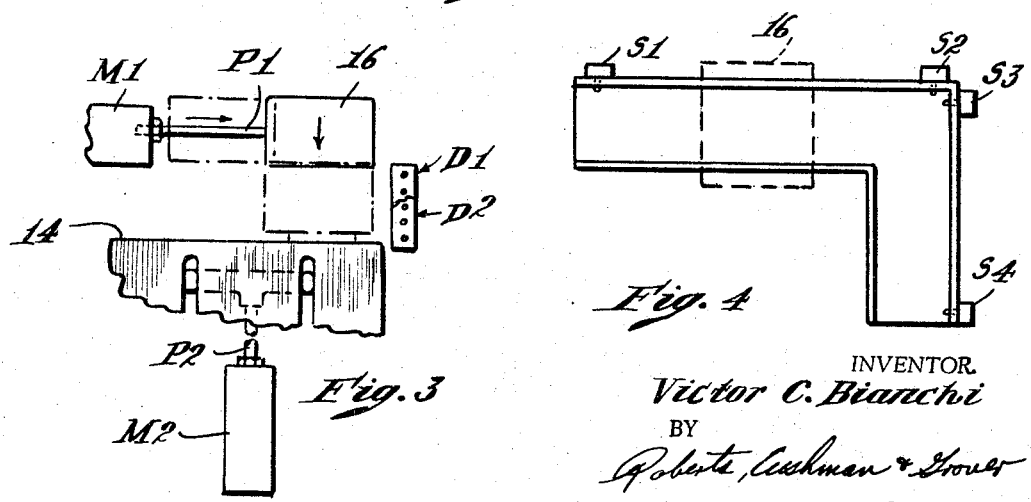
INVENTOR.
Victor C. Bianchi
BY
Roberts, Cushman & Grover
ATT'YS

United States Patent Office 3,329,050
Patented July 4, 1967

This invention relates to a control for machines and, in particular, to a control for a die-cutting machine of the kind in which there is a bed adapted to support a workpiece and one or more dies and a beam movable into a position above the bed and into engagement with the die to effect the cutting operation.

The principal objects of this invention are to provide a control for an automatic or semi-automatic machine of the foregoing kind which will automatically suspend operation of the machine when the operator places his hand or some part of his body in the path of movement of an operative part of the machine, either for the purpose of or while adjusting, positioning, removing or inspecting the work or the tools, and to automatically restart operation of the machine when he removes himself from danger; to provide manually operative means for effecting operation of the control so as to suspend operation of the machine when the operator wishes to leave the machine idle without disconnecting it from its source of power; and to provide a control which will not only automatically suspend operation of the machine but will return the operative parts, from whatever position suspension of operation is effected, to their initial position, so that the machine starts a new cycle of operation after each suspension.

As herein illustrated, in its broadest aspect for use with automatic machinery of the kind wherein there is continuous cycling of a tool from an inoperative to an operative position and means for effecting such cylling movement; the invention contemplates means for initiating operation of the cycling means and a detector operative to arrest the movement of the operative part of the machine from its inoperative position to its operative position and to return it to its inoperative position whenever intercepted by the operator. The first-named means is operative to restart movement of the tool on a new cycle upon removal of the offending part of the body from the path of movement. The foregoing control has general application to machinery in which there are movable parts operating cyclically and more specific application to die-cutting machinery wherein there is a support for work which is to be die-cut, one or more dies and a pressure-applying member movable from an inoperative position to a position to apply cutting pressure to the die. Machines of this kind require especially that the operator be able to place the die carefully on the work in a proper position and thus require that the pressure-applying member be withdrawn to one side, and yet to be useful such machines must be substantially automatic in operation and hence it is desirable to restart the machine automatically after any such suspension of operation. By the use of the aforesaid control means, the detector not only prevents injury by arresting the forward movement of the pressure-applying member if the operator is in a position of danger, but will also suspend operation of the machine whenever and for whatever length of time the operator is occupied in positioning a die on the support or inspecting work which has been performed and automatically restart the machine on a new cycle of operation. The detector means comprises photoelectric devices mounted on the machine in a position such that they are necessarily intercepted by the operator when performing any operation such as placing work in or removing work from the machine, inspecting the position of the work and/or the cutting tool, and the like, or of accidentally placing a part of the body in the path of movement of the moving part of the machine. Interception of the photoelectric means through a circuit, which includes motors for initiating and effecting the cylical movement of the operating parts, stops the motor having control of the machine at that part of the cycle and reverses the motor so as to return the operating part to its initial position. The circuit includes a shutter which is manually positionable opposite one of the photoelectric means to suspend operation of the machine until it is removed without disconnecting the machine from its source of power, and a starting switch by means of which the machine is connected to a source of power.

The invention will now be described in greater detail with reference to the accompanying drawings wherein:

FIG. 1 is a fragmentary perspective of a die-cutting machine embodying the control which forms the subject matter of this invention;

FIG. 2 is a block diagram of the operational flow of functions by means of which the machine may be automatically suspended and automatically restarted;

FIG. 3 diagrammatically illustrates the path of movement of the beam; and

FIG. 4 diagrammatically illustrates the several switches embodied in the circuit and their location in the machine.

Referring to the drawings (FIG. 1), there is shown a die-cutting machine 10 having a base 12 supporting a bed 14 in a horizontal position. A beam 16 is mounted above the bed in a horizontal position on a pair of horizontally disposed, spaced parallel tracks 18 containing grooves 20 for receiving shoulders 22 at the ends of the beam 16 to enable movement of the beam from a position at the rear end of the bed, as shown in full lines in FIG. 1, forwardly, to a position over the bed, as shown in dot and dash lines, above a cutting die 28 resting on a workpiece w placed on the bed 14.

The tracks 18 have spaced parallel legs 24 which are slidably engaged with guide blocks 26 secured to the base 12 for movement of the rails vertically relative to the bed 14 and hence movement of the beam 16 downwardly into engagement with the cutting die.

Economical operation of the machine of the foregoing kind is necessarily automatic or semi-automatic, however, the cyclical movement of the beam 16 is a source of considerable danger to an operator because he may fail to stop the machine when he should in order to obtain maximum production. A convertional safety switch which would stop the machine is unacceptable because it interferes with automatic operation of the machine and hence is not used. The purpose of this invention is to provide a control which will enable safe operation by automatically stopping and restarting the machine whenever the operator repositions, replaces, inspects, or otherwise performs an operation which places him in a position of danger or when he accidentally places some part of his body in a position such as to be injured. The automatic stopping embodies suspending movement of the beam toward its operative position, returning it to its initial position and then immediately restarting the machine on its cycling when the offending part of the operator is removed from the path of movement of the beam. To this end a block diagram 30, as shown in FIG. 2 is provided, which includes a motor M1 for effecting horizontal movement of the beam 16, a motor M2 for effecting vertical movement of the beam 16, a starting switch S, cycling switches S1, S2, S3 and S4 and a detector comprised of the components D1, D2 operative to cause stoppage of the cyclical movement of the beam at any point in its path of forward movement, return the beam to its initial position and hold it in its initial position until the offending part of the body of the operator is removed. The detector D1, D2 comprises a plurality of photoelectric devices 36 mounted in a housing 32 fastened by brackets 34 to the base of the machine at one side of the forward edge of the bed 14, and a corresponding number of lamps mounted in a housing 33 on the other side of the bed. Thus, an operator standing in front of the machine must necessarily intercept one or more of the light beams passing from the lamps at the one side to the light sensitive devices at the other side of the machine whenever he performs any operation on the bed of the machine, for example, placing dies in position on the work resting on the bed or removing work and replacing it with other work, or of bending over the bed to inspect the positions of the dies or the character of the work being performed. A vertical bank of photoelectric detector components, namely lamps and photoelectric elements, respectively, is provided at each side, which banks correspond substantially in height to the vertical movement of the beam 16 so that any movement of the operator within this range will stop forward movement of the beam and/or vertical movement thereof.

Referring specifically to FIGS. 3 and 4 which diagrammatically show the horizontal and vertical movement of the beam and the positions of the several switches which afford cycling, there is a switch S1 which operates when the starting switch S is closed to initiate the cycling of the machine by starting the motor M1 in a direction to advance the beam 16 horizontally forward from the rear end of the bed to a position vertically above the bed, a switch S2 operable by movement of the beam 16 to the forward position to halt operation of the motor M1, a switch S3 to initiate operation of the motor M2 to effect downward movement of the beam for contact with the cutting die on the bed, and a switch S4 positioned to be engaged by the beam 16 in its lowermost position to reverse the direction of rotation of the motor M2 so as to raise the beam 16 from the bed. When the beam 16 reaches its uppermost position, it actuates switch S3 to halt operation of the motor M2 and it actuates switch S2 to initiate operation of the motor M1 in a reverse direction to move the beam 16 rearwardly to its initial position. As the beam 16 moves to its rearward position it again contacts the switch S1 which reverses the motor M1 to move the beam 16 forward again through another cycle. This cycling will continue until the starting switch S is opened or until the detector means D1, D2 is responsive to an interruption of any one or more of its bank of light beams stops the motor M1 or M2 depending upon the position of the beam 16, reverse its rotation and thus return the beam 16 to its initial position where it will remain until the interfering part of the body is removed. A shutter B is mounted on one of the housings 33, in easy reach of the operator, which may be pushed across one of the light beams between two photoelectric components to suspend operation of the machine temporarily thereby to enable the operator to leave the machine idle without having to open the main starting switch S. It will be understood that FIG. 2 indicates the operational flow of functions between the photoelectric detector and the various switches and motors and is not intended to be a circuit diagram. Circuitry for carrying out the above described responses and functions can be of various conventional types familiar to those skilled in this art.

The motors M1 and M2 shown in FIG. 3 are of the fluid-pressure operative type, the motor M1 being connected by a piston rod P1 to the rear side of the beam 16 and the motor M2 being connected by a piston rod P2 to a yoke member connecting the lower extremities of the legs 24 beneath the bed 14. As will be seen by reference to FIG. 3, the beam 16 moves forwardly horizontally and then downwardly vertically and the photoelectric detector means D1, D2, comprise vertically disposed pairs of photoelectric components with the lowermost pair situated substantially at the level of the bed 14 and the uppermost pair substantially at the level of the beam 16 when the latter is in its elevated position.

It should be understood that the present disclosure is for the purpose of illustration only and that this invention includes all modifications and equivalents falling within the scope of the appended claim.

I claim:

In a machine for die-cutting, a bed upon which may be placed work for cutting and a die for effecting cutting, a pressure-applying member supported above the bed for horizontal movement parallel to the bed and vertical movement perpendicular to the bed, means for effecting horizontal movement of the pressure-applying member from a retracted and inoperative position to a forward position above the bed, means rendered operable by movement of the member to said forward position above the bed to effect vertical movement of the pressure-applying member downwardly toward the bed to apply pressure to the die resting on the bed, means operative at the lowermost position of the pressure-applying member to initiate vertical movement of the pressure-applying member to raise it from the bed, and means operative at the elevated position of the pressure-applying member to effect horizontal movement of the pressure-applying member to its inoperative position, photo-electric means comprising a housing mounted at the forward end of each side of the bed, said housings containing in their confronting sides a plurality of vertically spaced apertures, behind which are, respectively, at one side light sources and at the other side light sensitive cells, said apertures ranging from substantially the plane of the bed to the upper level or elevated position of the pressure-applying member and at intervals such that the photoelectric means scans the entire area from the bed to said upper level or elevated position of the pressure-applying member, said photoelectric means arresting either said forward or downward movement of the pressure-applying member and returning it to its initial position in response to interruption of the photoelectric field and means thereafter immediately automatically re-initiating the cycle of operation of the pressure-applying member upon the removal of said interruption, and a manually positionable shutter plate mounted on one of the housings for movement from an inoperative position to a position to cover one of the apertures of the photoelectric means thereby to stop cycling of the machine independently of the interruption of the photoelectric field by the operator.

References Cited

UNITED STATES PATENTS

| 2,058,668 | 10/1936 | Davis | 192—130 |
| 2,241,556 | 5/1941 | MacMillin et al. | 192—130 |
| 3,204,506 | 9/1965 | Reinhold | 83—534 |

ANDREW R. JUHASZ, *Primary Examiner.*

L. TAYLOR, *Assistant Examiner.*